United States Patent Office 3,082,020
Patented Mar. 19, 1963

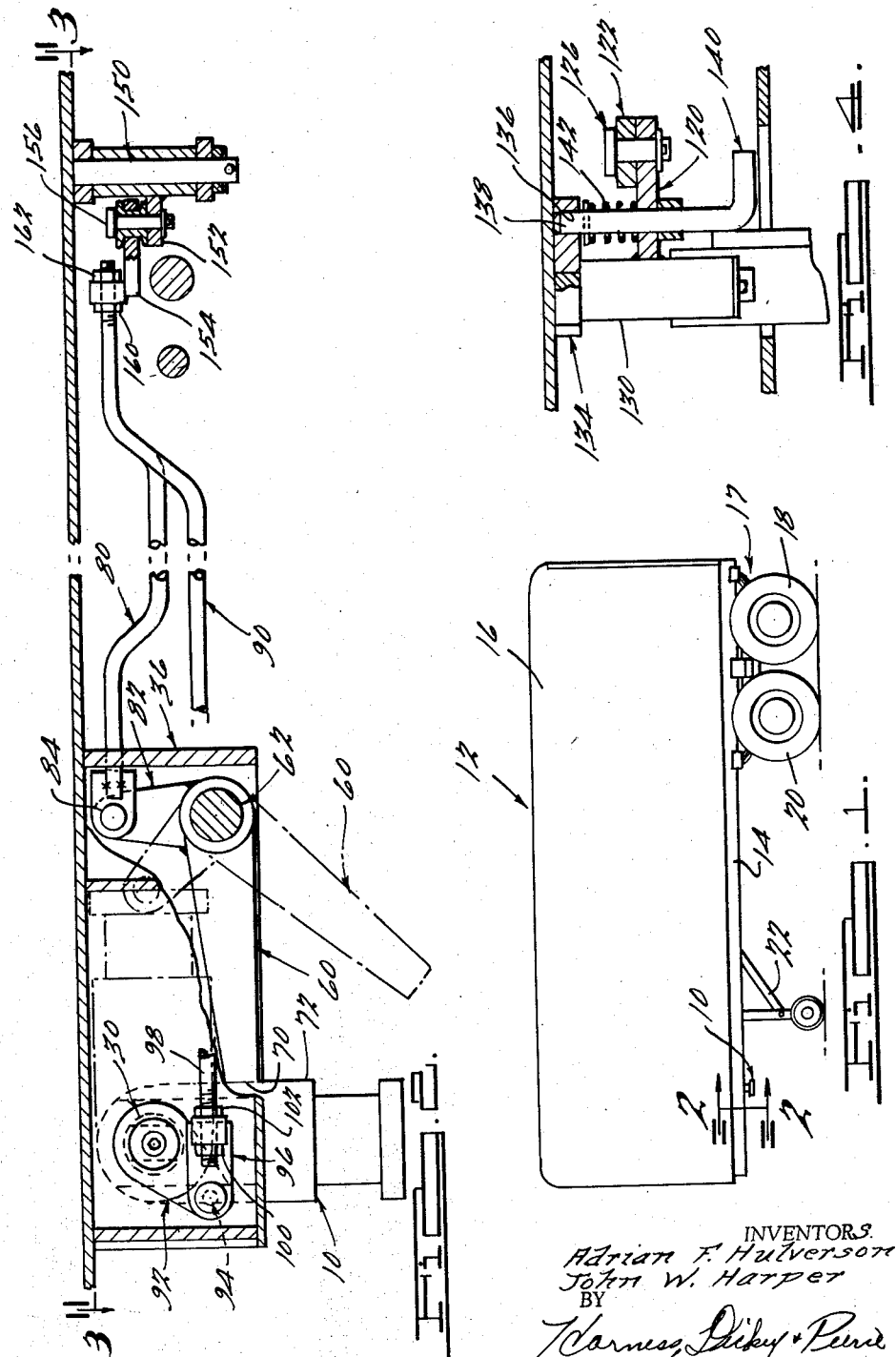

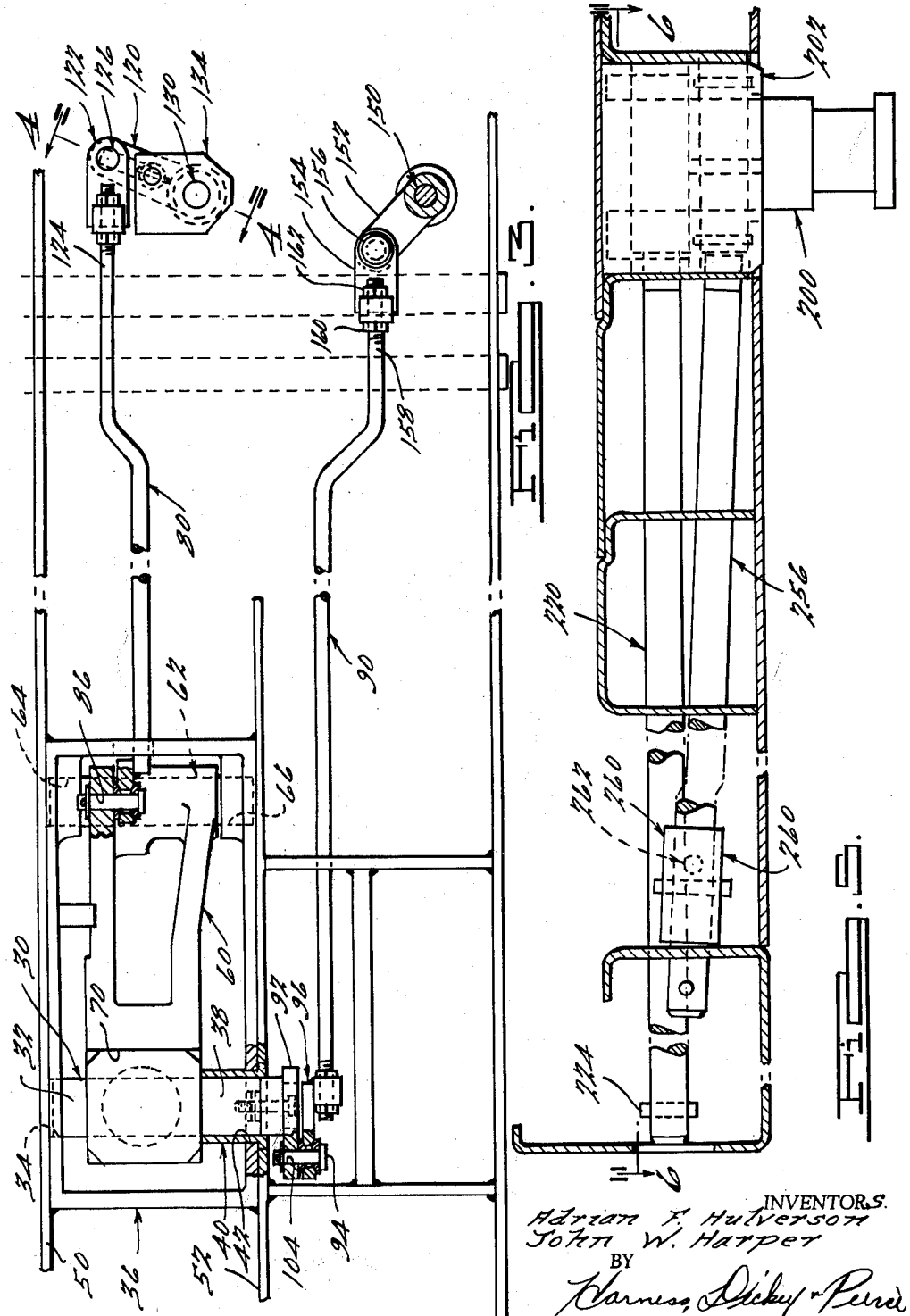

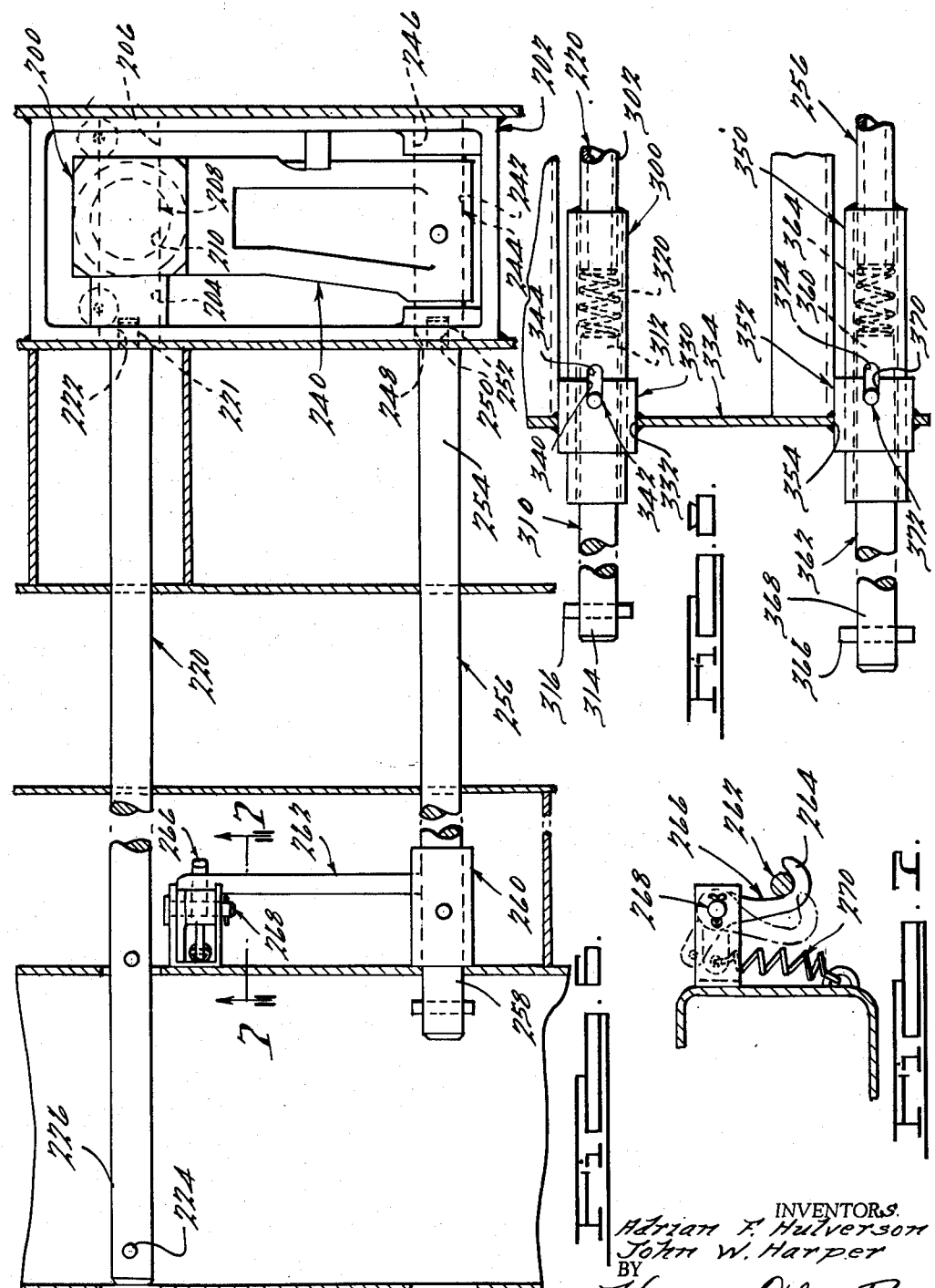

3,082,020
KINGPIN CONSTRUCTION
Adrian F. Hulverson, Drayton Plains, and John W. Harper, Detroit, Mich., assignors to Fruehauf Trailer Company, Detroit, Mich., a corporation of Michigan
Filed Nov. 24, 1961, Ser. No. 154,789
2 Claims. (Cl. 280—433)

This invention relates generally to wheel vehicles and more particularly to an externally operable folding kingpin.

Heavy duty semitrailers are generally provided with a kingpin that is engageable with the fifth wheel on a tractor to form the tractive coupling between the tractor and trailer. It is often desirable that the kingpin be pivotally mounted so as to be movable from the downwardly depending operative condition to a storage or inoperative condition to facilitate, for example, removal of a wheel suspension or landing gear from the trailer frame.

Obviously, a folding kingpin must be provided with means for locking the kingpin in the operative condition and capable of withstanding the relatively heavy tractive loads to which the coupling assembly between the tractor and trailer is subjected. Folding kingpins heretofore known and used characteristically have employed locks that are either unsatisfactory from the standpoint of structural integrity or are accessible only from under the vehicle. This latter condition requires the vehicle operator to reach or crawl under the trailer in order to release the locking device and subsequently effect rotation of the kingpin between the operative and stored condition or vice versa. This mode of operation is generally undesirable in that the kingpin assembly is often covered with dirt, with ice or other debris and relatively difficult to move by hand between the operative and stored conditions. Further, it is relatively difficult for the operator to effect adequate leverage on the kingpin in that he is required to first crouch under the trailer and then move the kingpin from this relatively awkward position.

The kingpin construction of the instant invention offers a material advancement in the vehicle art in that it is relatively strong, positively lockable, and obviates the need for crawling under the trailer to unlock and move the kingpin between the locked and unlocked conditions. An improved locking means both positively locks the kingpin in the downwardly depending condition and retains the kingpin in the stored or inoperative condition. The lock, as well as rotation of the kingpin, is effected from the exterior of the trailer by an operator in a normal standing position. The operator is therefore capable of exercising maximum leverage on the kingpin and lock to effect movement of the respective elements between the operative and storage conditions.

Accordingly, one object of the instant invention is an improved kingpin construction.

Another object is an improved folding kingpin.

Another object is an improved externally operable folding kingpin.

Another object is an improved lock for a folding kingpin.

Other objects and advantages of the present invention will be apparent in the following specification, claims and drawings, wherein:

FIGURE 1 is a side elevational view of a semitrailer provided with a folding kingpin in accordance with the instant invention;

FIG. 2 is a cross-sectional view taken substantially along the line 2—2 of FIGURE 1;

FIG. 3 is a cross-sectional view taken substantially along the line 3—3 of FIG. 2;

FIG. 4 is a cross-sectional view taken substantially on the line 4—4 of FIG. 3;

FIG. 5 is a cross-sectional view of a modified folding kingpin construction;

FIG. 6 is a cross-sectional view taken substantially along the line 6—6 of FIGURE 5;

FIG. 7 is a cross-sectional view taken substantially along the line 7—7 of FIGURE 6; and FIG. 8 is a cross-sectional view similar to FIGURE 7 of yet another modified version of the folding kingpin.

As seen in FIGURE 1 of the drawings, a folding kingpin 10 is shown in operative association with a conventional semitrailer 12. The trailer 12 comprises a frame 14, a van-type body 16, a wheel suspension 17 having road-contacting pairs of wheels 18 and 20 and a landing gear 22.

As best seen in FIGURES 2 and 3 the folding kingpin 10 is rotatably supported on a shaft 30 for rotation between a downwardly depending operative condition, shown in solid lines in FIGURE 2, and a horizontal storage condition, shown in broken lines in FIGURE 2. The shaft 30 is supported at one end 32 thereof in a complementary aperture 34 in a box-like kingpin housing 36. The opposite end portion 38 of the shaft 30 is journaled in a complementary bushing 40. The bushing 40 is accepted in a complementary aperture 42 in the housing 36. The housing 36 is secured to spaced lateral frame members 50 and 52 as by welding. It is to be noted that the kingpin 10 is swingable in a generally vertical plane that extends laterally of the frame 14 of the trailer 12.

The kingpin 10 is locked in the downwardly depending condition and retained in the horizontal storage condition by a locking bar 60. The locking bar 60 is pivotally supported by a shaft 62 that is rotatably supported in complementary apertures 64 and 66 in the housing 36. An end face 70 of the locking bar 60 is engageable with a complementary flat surface 72 on the kingpin 10 to retain the kingpin 10 in the downwardly depending condition. The locking bar 60 underlies the kingpin 10 when the kingpin 10 is in the storage condition thereby to keep the kingpin from rotating downwardly.

From the foregoing description it should be apparent that, in order to rotate the kingpin 10 from the downwardly depending operative condition to the storage condition, the locking bar 60 must be rotated to the dash line position shown in FIGURE 2. When in the open or unlocked condition, the locking bar 60 permits rotative movement of the kingpin 10.

Movement of the locking bar 60 between the locked and open conditions is effected by reciprocal movement of a locking bar operator shaft 80. The operator shaft 80 is rotatably coupled to a bell crank portion 82 of the kingpin 60 as by a pin 84. The pin 84 extends through a complementary aperture 86 in the bell crank portion 82 of the locking bar 60 thereby to translate reciprocal movement of the shaft 80 into rotation of the locking bar 60 about its supporting shaft 62.

Rotation of the folding kingpin 10 between the downwardly depending operative condition and the horizontal storage condition is effected by a kingpin operating shaft 90 that is secured to a kingpin crank 92 as by a pin 94. The pin 94 extends through a generally L-shaped coupling link 96 that is adjustably secured to a threaded terminal end portion 98 of the rod 90 as by a pair of complementary nuts 100 and 102. The pin 94 extends through a complementary aperture 104 in the kingpin crank 92 thereby to translate reciprocal movement of the rod 90 into rotation of the crank 92, shaft 30 and kingpin 10.

Reciprocal movement of the locking bar operator rod 80 is effected by a crank 120 (FIG. 4) that is rotatably coupled to a bracket 122 on the terminal end 124 of the rod 80 as by a pin 126. The crank 120 is secured to a vertical shaft 130 that is rotatably supported in a complementary bearing block 134.

As best seen in FIGURE 4 the bearing block 134 has an aperture 136 therein for the acceptance of a terminal end portion 138 of a generally L-shaped locking key 140. The locking key 140 is normally biased upwardly, as seen in FIGURE 4, by a helical compression spring 142. Thus, upon rotation of the shaft 130, as by rotation thereof with a conventional crank handle (not shown), the key 140 is movable into axial alignment with the aperture 136 whereupon the key 140 is biased upwardly by the spring 142 to lock the shaft 130, crank 120, rod 80, crank 82 and locking bar 60 in the locked condition with respect to the housing 36. It is to be noted that the shaft 80 and locking bar 60 are lockable in the locked condition both to hold the kingpin 10 in the downwardly depending condition and to retain the kingpin 10 in the upper horizontal or storage condition.

The locking bar 60 is conditioned for rotation to the unlocked condition shown in dashed lines in FIGURE 2 by simply pulling downwardly on the locking key 140, thereby to disengage the end portion 138 thereof from within the aperture 136 in the shaft support plate 134.

After the locking bar 160 is moved to the unlocked condition, rotation of the kingpin 10 between the downwardly depending and storage conditions is effected by the operating shaft 90 upon rotation of a shaft 150 as by a conventional crank handle (not shown). A crank 152 is received on the shaft 150 as by welding and to a generally L-shaped terminal bracket 154 as by a pin 156. The bracket 154 is adjustably secured to a terminal end portion 158 of the rod 90 as by a pair of nuts 160 and 162.

As best seen in FIGS. 5 and 6, a modified folding kingpin 200 comprises a housing 202 consisting of, for example, a steel casting having a pair of spaced aligned apertures 204 and 206 therein for the acceptance of a kingpin support shaft 208. The shaft 208 extends through a complementary aperture 210 in the kingpin 200. Rotation of the shaft 208 and therefore of the kingpin 200 is effected by a kingpin drive shaft 220 having a tongue 221 that is accepted in a complementary groove 222 in the support shaft 208. Rotation of the shaft 220 is effected by a conventional crank (not shown) upon engagement thereof with a pin 224 on an outer end 226 of the shaft 220.

The kingpin 200 is conditioned for rotation between the downwardly depending operative condition and the horizontal inoperative or storage condition upon movement of the kingpin locking bar 240 to an unlocked or open condition. The locking bar 240 has a bore 242 therein for the acceptance of a complementary shaft 244. The shaft 244 is journaled in complementary apertures 246 and 248 in the housing 202. The shaft 244 has a slot 250 in one end thereof for the acceptance of a complementary tongue 252 on an inner end portion 254 of a locking bar drive shaft 256.

An outer end portion 258 of the locking bar drive shaft 256 extends through a complementary sleeve 260 having a latching arm 262 secured thereto. A drive pin 261 extends through the outer end portion 258 of the shaft 256 for the acceptance of a conventional crank (not shown).

As best seen in FIG. 7, the key 262 is normally held in a gooseneck portion 264 of a latch 266. The latch 266 is pivotally supported on a pin 268 for counterclockwise rotation, as seen in FIG. 7, under the bias of a tensioned helical coil spring 270.

The kingpin 200 is conditioned for rotation between the downwardly depending operative condition and the horizontal storage condition by first rotating the lock drive shaft 256 as by a conventional crank (not shown) to move the key 262 upwardly as seen in FIG. 7 of the drawings. As seen in FIG. 6 of the drawings, this would require clockwise rotation of the shaft as viewed from the outer end thereof. Initial clockwise rotation of the shaft 256 allows the key 262 to be rotated clockwise, as seen in FIG. 7 of the drawing, to the unlatched condition. The shaft 256 and locking bar 240 are then rotated counterclockwise to the unlocked condition whereupon the kingpin 200 can be rotated relative to the housing 202.

After the locking bar 240 is positioned in the unlocked condition, the crank is engaged with the pin 224 on the shaft 220 and the kingpin 200 rotated either to the downwardly depending operative condition or the horizontal storage condition. The crank is then engaged with pin 261 on the locking bar shaft 256 and the locking bar 240 is rotated to the locked condition. It is to be noted that as the key or latch arm 262 moves to the locked condition, it contacts the gooseneck portion 264 on the latch 266 biasing the latch clockwise against the bias of the spring 270. Subsequently, the latch 266 is biased counterclockwise by the spring 270 to positively engage the latch arm 262 and preclude rotation of the locking bar 240 from the locked condition.

Referring to FIG. 8 of the drawings, a modified lock system for the kingpin and locking bar operating shafts 220 and 256, respectively, comprises a sleeve 300 that is secured to an outer end portion 302 of the kingpin operating shaft 220, as by welding. A coupler shaft 310 has an inner end portion 312 journaled in the sleeve 300 and an opposite end portion 314 having a pin 316 thereon for engagement with a conventional crank (not shown). A helical compression spring 320 extends between the end portions 302 and 312 of the kingpin operating shaft 220 and coupler shaft 310 to normally bias the coupler shaft 310 axially outwardly of the sleeve 300. The sleeve 300 is journaled in a complementary bushing 330 that is secured in a complementary aperture 332 in a frame member 334, as by welding.

The bushing 330 has an axial slot 340 therein for the acceptance of a pin 342 that extends through a complementary slot 344 in the sleeve 300 and into the end portion 312 of the coupler shaft 310. Thus, it will be seen that, upon pushing the coupler shaft axially inwardly against the compression spring 320, the pin 342 thereof is moved axially outwardly of the slot 340 in the bushing 330. The coupler shaft 310 is thus conditioned for rotation with respect to the bushing 330, and effects rotation of the sleeve 300 and kingpin drive shaft 220 by engagement of the pin 342 in the slot 344 in the sleeve 300.

The kingpin locking bar operating shaft 256 is accepted in a complementary sleeve 350 that is journaled in a bushing 352. The bushing 352 is accepted in a complementary aperture 354 in the frame 334 and secured thereto, as by welding. An inner end portion 360 of a coupler shaft 362 is journaled in the sleeve 350 and is normally biased outwardly thereof as by helical compression spring 364. The coupler shaft 362 has a pin 366 on an outer end 368 thereof for engagement with a conventional crank (not shown). The bushing 352 has an axially extending slot 370 therein for the acceptance of a pin 372 on the coupler shaft 362. The pin 372 is also accepted in a complementary slot 374 in the sleeve 350.

Thus, by pushing inwardly on the coupler shaft 362, the spring 364 is compressed and the pin 372 on the shaft 362 moves outwardly of the slot 370 in the bushing 352. After the pin 372 is displaced outwardly of the slot 370, it is free to rotate relative to the bushing 352 thereby effecting rotation of the sleeve 350 through engagement of the slot 374 therein. Rotation of the sleeve 350 is transmitted to the locking bar shaft 256 thereby to effect rotation of the locking bar 240 between the locked and unlocked conditions. Obviously, retraction of the pins 342 and 372 into the slots 340 and 370 in the bushings 330 and 352, effects locking of the kingpin 200 and kingpin locking bar 240, respectively.

From the foregoing description, it should be apparent that the kingpin construction of the instant invention is of relatively rugged construction and is positively lockable in a downwardly operative condition and a generally horizontal retracted condition. Both the kingpin and the locking bar therefor are operable from the exterior of the trailer, obviating the need for crawling under the trailer to either condition the kingpin for movement between an operative and a storage condition or effect movement thereof.

It is to be understood that the specific constructions of the improved kingpin construction herein disclosed and described are presented for the purpose of explanation and illustration and are not intended to indicate limits of the invention, the scope of which is defined by the following claims.

We claim:

1. A folding kingpin for a wheeled vehicle comprising a rigid box-like housing having spaced parallel side walls therein, a kingpin support shaft extending between said walls, a kingpin rotatably supported by said shaft for rotation between a downwardly depending operative condition and a generally horizontal inoperative condition, a locking bar support shaft extending between the walls of said housing in spaced generally parallel relation to said kingpin support shaft, a locking bar rotatably supported on said locking bar shaft for rotation between a locked condition and an open condition, said locking bar extending generally normally to and engageable with said kingpin when said kingpin and locking bar are in the operative and locked condition, respectively, said locking bar extending generally parallel to and underlying said kingpin when said kingpin and locking bar are in the inoperative and locked condition, respectively, means extending to the outer periphery of said vehicle for rotating said locking bar between the locked and unlocked conditions, means extending to the outer periphery of said vehicle for rotating said kingpin between the operative and inoperative conditions, and means for locking said locking bar rotating means and locking bar in the locked condition.

2. A folding kingpin for a wheeled vehicle comprising a rigid box-like housing disposed centrally of the sides of the vehicle, a kingpin support shaft in said housing, a kingpin on said shaft rotatable between a downwardly depending operative condition and a generally horizontal inoperative condition, a locking bar shaft in said housing extending in spaced generally parallel relationship to said kingpin shaft, a locking bar on said locking bar shaft and rotatable between a generally horizontal locked condition and an open condition, said locking bar extending generally normally to and engageable with said kingpin when said kingpin and locking bar are in the operative and locked condition, respectively, said locking bar extending generally parallel to and underlying said kingpin when said kingpin and locking bar are in the inoperative and locked condition, respectively, a locking bar operating shaft extending to the outer periphery of said vehicle for rotating said locking bar shaft and locking bar between the locked and unlocked conditions, a kingpin operating shaft extending to the outer periphery of said vehicle for rotating said kingpin shaft and kingpin between the operative and inoperative conditions, and means for locking said locking bar operating shaft in the locked condition.

References Cited in the file of this patent

UNITED STATES PATENTS

| | | |
|---|---|---|
| 2,867,450 | Tenenbaum | Jan. 6, 1959 |
| 2,981,555 | Abolins | Apr. 25, 1961 |

FOREIGN PATENTS

| | | |
|---|---|---|
| 764,435 | Great Britain | Dec. 28, 1956 |